United States Patent [19]

Osaragi

[11] Patent Number: 5,208,452
[45] Date of Patent: May 4, 1993

[54] METHOD AND APPARATUS FOR RELIABLY DETECTING LIGHT BEAM IN THE PRESENCE OF UNDESIRABLE LIGHT, ESPECIALLY SUITABLE FOR SURVEYING INSTRUMENTS

[75] Inventor: Kazuki Osaragi, Tama, Japan

[73] Assignee: Kabushiki Kaisha TOPCON, Tokyo, Japan

[21] Appl. No.: 631,020

[22] Filed: Dec. 20, 1990

[30] Foreign Application Priority Data

Dec. 20, 1989 [JP] Japan .................................. 1-329938
Feb. 27, 1990 [JP] Japan .................................. 2-46941

[51] Int. Cl.⁵ ............................................ H01J 40/14
[52] U.S. Cl. ............................ 250/208.2; 250/214 B
[58] Field of Search ............... 250/203.2, 203.3, 203.4, 250/203.5, 206.1, 206.2, 208.2, 214 B, 214 R

[56] References Cited

U.S. PATENT DOCUMENTS

| | | | |
|---|---|---|---|
| 4,020,357 | 4/1977 | Punis | 250/568 |
| 4,341,956 | 7/1982 | Bax | 250/214 C |
| 4,388,526 | 6/1983 | Schroeder | 250/214 R |
| 4,676,634 | 6/1987 | Petersen | 356/4 |
| 4,707,689 | 11/1987 | DiPiazza et al. | 250/214 B |
| 4,827,119 | 5/1989 | Gaboury | 250/214 R |
| 4,840,069 | 6/1989 | Hampton et al. | 250/214 B |
| 5,049,735 | 9/1991 | Kitajima et al. | 250/208.2 |

FOREIGN PATENT DOCUMENTS 61-37567 8/1986 Japan .

OTHER PUBLICATIONS

Dillard, G. M., et al., "Radar Automatic Detection", 176 *Microwave Journal*, 28 (Jun. 1985) No. 6, Dedham, Massachusetts, pp. 125-130.

*Primary Examiner*—David C. Nelms
*Assistant Examiner*—Stephone B. Allen
*Attorney, Agent, or Firm*—Mason, Fenwick & Lawrence

[57] ABSTRACT

The present invention provides a photodetection apparatus having such an arrangement that when signals from the light receiving means in the photodetection device are sampled at a frequency substantially equal to the lowest frequency at which the source of pulse rays is lighted on, one of the noise signal $I_{nc}$ due to the pulsed illumination as from the fluorescent lamp and the normal output signal $I_{sc}$ from the laser beam necessarily presents for each of the sampling periods. In the preferred forms, output signal values sampled in the number of cycles corresponding to at least three times the sampling period are compared with each other. If it is judged that one output signal is larger than the other two output signals which are substantially equal to each other, it is determined that the one output signal is a normal output signal $I_{sc}$ from the laser beam. The one output signal is then taken for the subsequent signal processing step. In the other case, all the output signals are determined to be noise signals from disturbance rays as from the fluorescent lamp, including AC components and will not be taken for the subsequent signal processing step. In such a manner, any adverse affection due to the pulsed AC rays can be eliminated.

8 Claims, 7 Drawing Sheets

| ADRESS | | | | | | | | | |
|---|---|---|---|---|---|---|---|---|---|
| 101 | 0 | 0 | 0 | 1 | 0 | 0 | 1 | 1 | 0 |
| 102 | 0 | 0 | 0 | 1 | 0 | 0 | 1 | 0 | 1 |
| 103 | 0 | 0 | 1 | 0 | 1 | 1 | 1 | 0 | 0 |
| 201 | 0 | 0 | 0 | 1 | 0 | 0 | 1 | 1 | 0 |
| 202 | 0 | 0 | 0 | 1 | 0 | 0 | 1 | 1 | 1 |
| 203 | 0 | 0 | 1 | 0 | 0 | 1 | 1 | 0 | 0 |

FIG. 8

ADRESS

| 801 | 0 | 0 | 0 | 1 | 0 | 0 | 1 | 1 | 0 |
| --- | --- | --- | --- | --- | --- | --- | --- | --- | --- |
| 802 | 0 | 0 | 1 | 0 | 1 | 1 | 1 | 0 | 0 |

| 901 | 0 | 0 | 0 | 1 | 0 | 0 | 1 | 1 | 0 |
| --- | --- | --- | --- | --- | --- | --- | --- | --- | --- |
| 902 | 0 | 0 | 1 | 0 | 0 | 1 | 1 | 0 | 0 |

METHOD AND APPARATUS FOR RELIABLY DETECTING LIGHT BEAM IN THE PRESENCE OF UNDESIRABLE LIGHT, ESPECIALLY SUITABLE FOR SURVEYING INSTRUMENTS

BACKGROUND OF THE INVENTION

1. Field of the Invention

The present invention relates to a method and apparatus of optically detecting a beam of light such as laser beam and the like. More particularly, the present invention concerns a photodetection apparatus suitable for use in such a rotating laser system as known in the fields of survey, construction and civil engineering and a method of photodetection therein.

2. Description of the Related Art

Photodetection techniques for measuring the intensity of light, the position of projected light and others have been broadly utilized in various fields.

FIG. 5 shows an example of rotating laser systems for performing the leveling in the survey, construction and civil engineering. Such a rotating laser system comprises a laser beam projecting device 2 and a photodetection device 1 for receiving the laser beam from the laser beam projecting device 2.

The laser beam projecting device 2 emits a laser beam L turned about a vertical axis O to define a reference plane P. The photodetection device 1 is positioned on a vertical stationary plane such as wall or pile and comprises at least first and second light receiving elements 11 and 12.

If the laser beam L from the laser beam projecting device 2 is projected only onto the upper light receiving element 11, this means that a reference mark 5 in the photodetection device 1 is positioned below the reference plane P defined by the laser beam L. This position of the laser beam causes "upward direction" indicators 3b and 4b to light on. Each of these indicators 3b and 4b has an upward arrow indicating the necessary upward movement of the photodetection device 1. On the contrary, if the laser beam is projected only onto the lower light receiving element 12, this means that the reference mark 5 in the photodetection device 12 is positioned above the reference plane L. As a result, it causes "downward direction" indicators 3a and 4a each having an downward arrow to light on. The necessary downward movement of the photodetection device 1 is thus indicated. In addition, if the laser beam L is equally projected on both the upper and lower light receiving elements 11 and 12, it causes "center" indicators 3c and 4c to light on. This informs an operator that the reference mark 5 in the photodetection device 1 is brought into alignment with the reference plane P. The operator can obtain a leveling mark by drawing a line 1e on the wall or pile at the position of the reference mark 5.

Since the rotating laser device is frequently used out in the fields, the light receiving elements 11 and 12 will also receive the sun's rays as disturbance rays in addition to the laser beam L from the laser beam projecting device 2 which is used for measurement. When the sun's rays enter the light receiving elements 11 and 12, these elements will output a combination of its normal signals (pulsed signals) based on the laser beam L with DC noise signal components which are created from the reception of the sun's rays and superposed over the normal signals.

In order to overcome such a problem, the prior art photodetection device 1 comprises AC coupling circuits as composed of capacitors, which are connected with the respective light receiving elements 11 and 12. Each of the AC coupling circuits serves to eliminate the adverse affection of the sun's rays by removing the DC noise signal components and taking out only the pulsed DC components from the normal signals based on the laser beam L.

On the other hand, the rotating laser system may be utilized indoors. In this case, the photodetection device 1 will receive indoor illumination rays from any source of pulsed light such as fluorescent lamp. In general, the fluorescent lamp repeatedly turns on and off at a frequency of 100 Hz or 120 Hz or more. Thus, variations in the intensity of outputted rays cause pulsed AC components as shown by $I_n$ in FIG. 6(a), such components being mixed with the normal signals $I_s$ from the laser beam L.

In the prior art photodetection device 1, the AC coupling circuits can remove only DC noise signal components. As a result, the output signals from the AC coupling circuits contain a combination of the normal output signal $I_{sc}$ from the laser beam L with AC noise signals $I_{nc}$ from the illumination rays of the fluorescent lamp if the photodetection device 1 is used under the illumination of the fluorescent lamp, as shown in FIG. 6(b). The AC noise signals $I_{nc}$ will be also inputted into the processing circuit of the photodetection device 1. In the prior art, the processing circuit of the photodetection device 1 is not constructed so as to distinguish the AC noise signals $I_{nc}$ from the normal output signal $I_{sc}$. This results in errors in operation and measurement.

The present invention is directed to provide a photodetection method and apparatus which can prevent any error in operation and measurement from being created from the influence of disturbance rays from a source of pulsed light such as fluorescent lamp or the like.

SUMMARY OF THE INVENTION

To this end, the present invention provides a photodetection method comprising a first step of converting the amount of received rays into an electrical signal; a second step of maintaining the maximum value of said electrical signal for a predetermined sampling period; a third step of recording the maximum value of said electrical signal; a fourth step of judging whether or not said maximum signal value is stored in the number of cycles corresponding to at least three times said sampling period; and a fifth step of comparing said stored signal values with each other when it is judged that they have been stored by "three cycles" at said fourth step, said fifth step being adapted to take one signal value for the subsequent signal processing if said one signal value is larger than the two remaining signal values substantially equal to each other and to judge that said signal values are based on noises from disturbance rays in the other cases.

In the second aspect, the present invention provides a photodetection apparatus comprising light receiving means for converting the amount of received rays into an electrical signal; peak holding means for holding the maximum value of said electrical signal for a predetermined sampling period; means for storing the maximum value of said electrical signal; first judging means for judging whether or not said maximum signal value has been stored in the number of cycles corresponding to at least three times said sampling period; and second judging means for comparing the stored signal values with each other when said first judging means discriminates that the signal values have been stored by "three cycles", said second judging means being adapted to take one signal value for the subsequent signal processing if said one signal value is larger than the two remaining signal values substantially equal to each other and to judge that said signal values are based on noises from disturbance rays in the other cases.

In the third aspect, the present invention provides a photodetection apparatus comprising at least two light receiving means for receiving a beam of light turned about a vertical axis to define a reference plane and for converting the received light beam into an electrical signal, said photodetection apparatus being adapted to measure the amount of the entering light beam and to output a signal representing the relative positional relationship between the entering light beam and said reference plane, the improvement comprising peak holding means for holding the maximum value of said electrical signal for a predetermined sampling period; means for storing the maximum value of said electrical signal; first judging means for judging whether or not said maximum signal value has been stored in the number of cycles corresponding to at least three times said sampling period; and second judging means for comparing the stored signal values with each other when said first judging means discriminates that the signal values have been stored by "three cycles", said second judging means being adapted to take one signal value for the subsequent signal processing if said one signal value is larger than the two remaining signal values substantially equal to each other and to judge that said signal values are based on noises from disturbance rays in the other cases.

In the fourth aspect, the present invention provides a photodetection method comprising a first step of converting the amount of received rays into an electrical signal; a second step of maintaining the maximum value of said electrical signal for a predetermined sampling period; a third step of recording the maximum value of said electrical signal; a fourth step of judging whether or not said maximum signal value is stored in the number of cycles corresponding to at least two times said sampling period; and a fifth step of comparing said stored signal values with each other when it is judged that they have been stored by "two cycles" at said fourth step, said fifth step being adapted to take one signal value for the subsequent signal processing if said one signal value is larger than the other signal value substantially equal to each other and to judge that said signal values are based on noises from disturbance rays in the other cases.

In the fifth aspect, the present invention provides a photodetection apparatus comprising light receiving means for converting the amount of received rays into an electrical signal; peak holding means for holding the maximum value of said electrical signal for a predetermined sampling period; means for storing the maximum value of said electrical signal; first judging means for judging whether or not said maximum signal value has been stored in the number of cycles corresponding to at least two times said sampling period; and second judging means for comparing the stored signal values with each other when said first judging means discriminates that the signal values have been stored by "two cycles", said second judging means being adapted to take one signal value for the subsequent signal processing if said one signal value is larger than the other signal value substantially equal to each other and to judge that said signal values are based on noises from disturbance rays in the other cases.

In the sixth aspect, the present invention provides a photodetection apparatus comprising at least two light receiving means for receiving a beam of light turned about a vertical axis to define a reference plane and for converting the received light beam into an electrical signal, said photodetection apparatus being adapted to measure the amount of the entering light beam and to output a signal representing the relative positional relationship between the entering light beam and said reference plane, the improvement comprising peak holding means for holding the maximum value of said electrical signal for a predetermined sampling period; means for storing the maximum value of said electrical signal; first judging means for judging whether or not said maximum signal value has been stored in the number of cycles corresponding to at least two times said sampling period; and second judging means for comparing the stored signal values with each other when said first judging means discriminates that the signal values have been stored by "two cycles", said second judging means being adapted to take one signal value for the subsequent signal processing if said one signal value is larger than the other signal value and to judge that said signal values are based on noises from disturbance rays in the other cases.

In the seventh aspect, the present invention provides a photodetection apparatus wherein said storing means in the second and fifth aspect includes a RAM and wherein said first or second judging means includes a microprocessor.

The inventors noted that pulsed output signals created by pulses in illuminating rays from a source of pulse light such as fluorescent lamp are substantially equal in output intensity with a certain margin and that the output intensity in these pulsed output signals is smaller than that of the normal output signal $I_{sc}$ from the laser beam L, as seen from FIG. 6B. The inventors selected such an arrangement that when signals from the light receiving means in the photodetection device are sampled at a frequency substantially equal to the lowest frequency at which the source of pulse rays is lighted on, one of the noise signal $I_{nc}$ due to the pulsed illumination as from the fluorescent lamp and the normal output signal $I_{sc}$ from the laser beam necessarily presents for each of the sampling periods. In the abovementioned arrangements according to the first to third aspects, output signal values sampled in the number of cycles corresponding to at least three times the sampling period are compared with each other. If it is judged that one output signal is larger than the other two output signals which are substantially equal to each other, it is determined that the one output signal is a normal output signal $I_{sc}$ from the laser beam. The one output signal is then taken for the subsequent signal processing step. In the other case, all the output signals are determined to be noise signals from disturbance rays as from the fluorescent lamp, including AC components and will not be taken for the subsequent signal processing. In such a manner, any adverse affection due to the pulsed AC rays can be eliminated.

In the fourth to sixth aspects, similarly, output signal values sampled in the number of cycles corresponding to at least two times the sampling period are compared with each other. If it is judged that one output signal is larger than the other output signal, the one output signal is determined to be a normal output signal $I_{sc}$ from the laser beam.

BRIEF DESCRIPTION OF THE DRAWINGS

FIG. 8 is a table similar to FIG. 4, illustrating the second embodiment of the present invention.

DETAILED DESCRIPTION OF THE PREFERRED EMBODIMENTS

The present invention will now be described by way of example in connection with the photodetection device of the rotating laser system.

Figure 1:
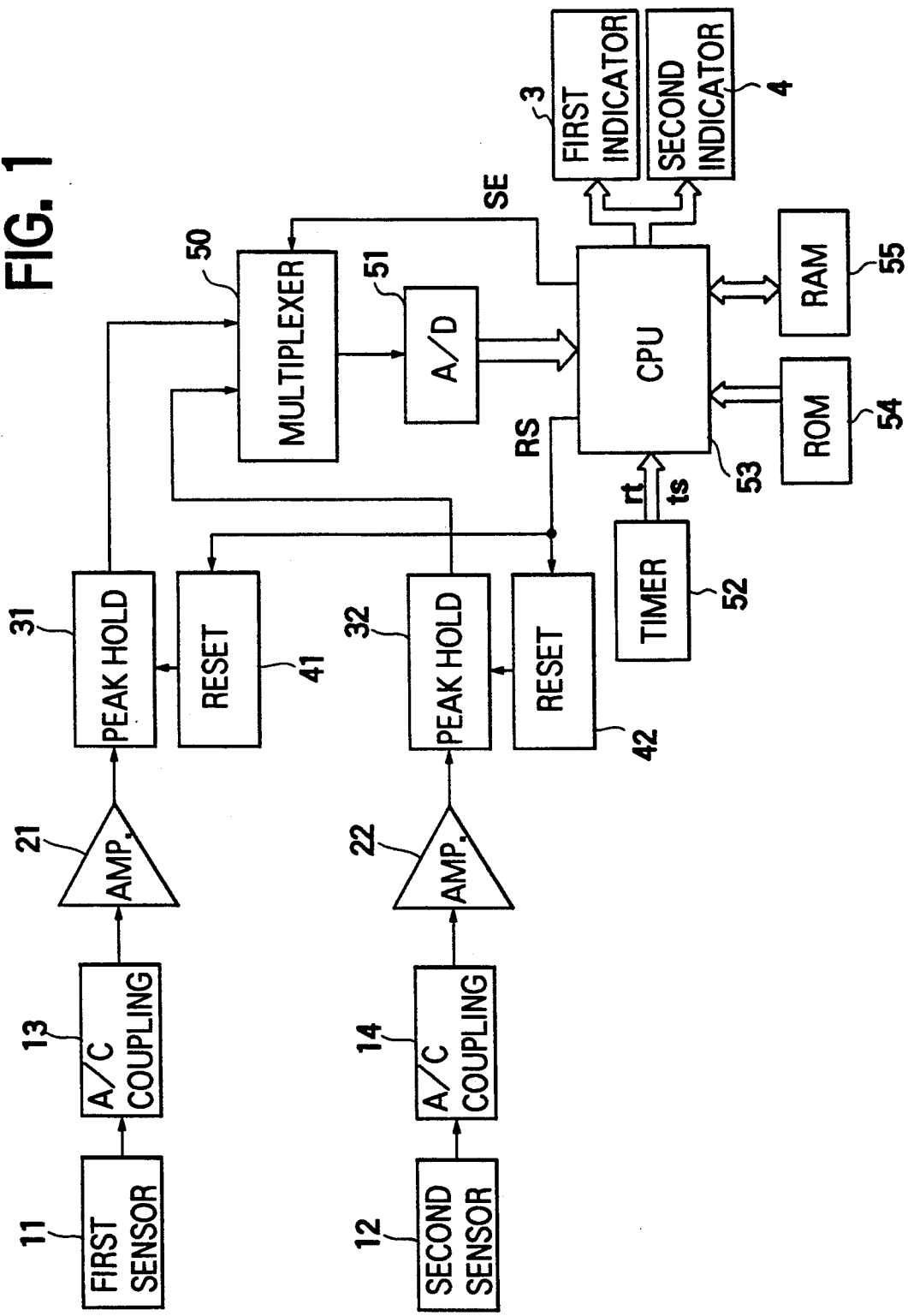
FIG. 1 is a block diagram of a circuitry in a photodetection apparatus constructed in accordance with the present invention.
Figures 4, 5:
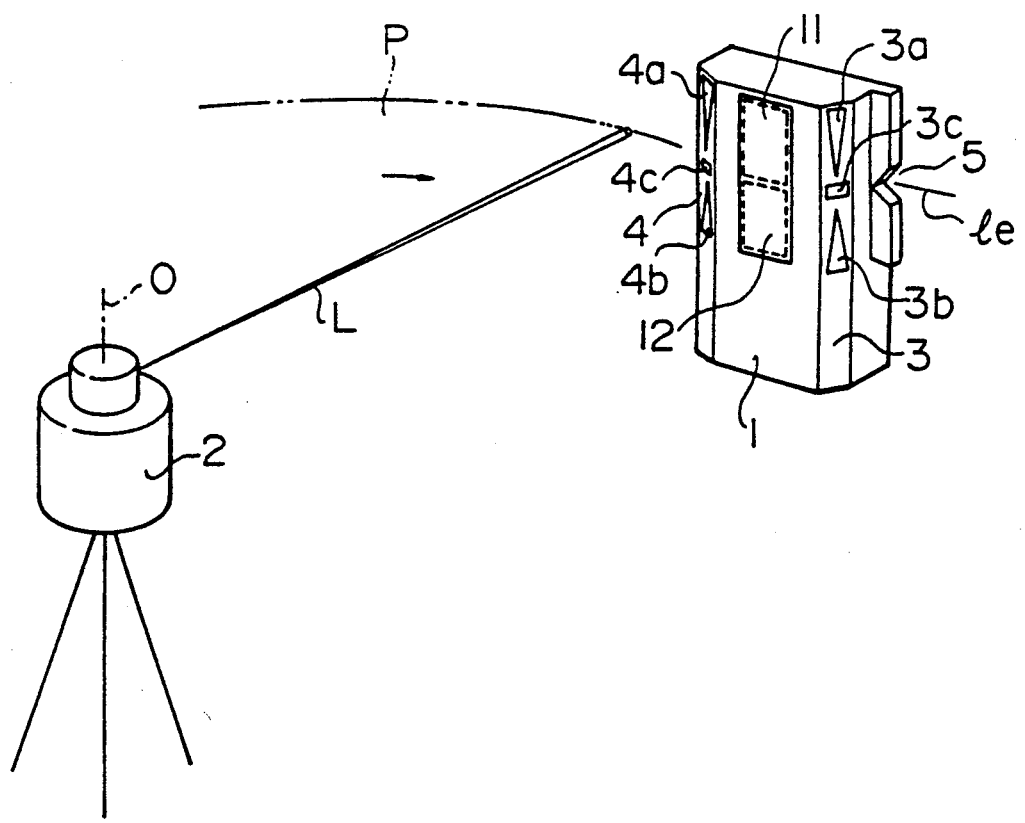
FIG. 4 is a table illustrating the contents of the RAM 55.
FIG. 5 is a perspective view of a rotating laser system which can utilize the prior art and the photodetection device of the present invention.
Figure 6:
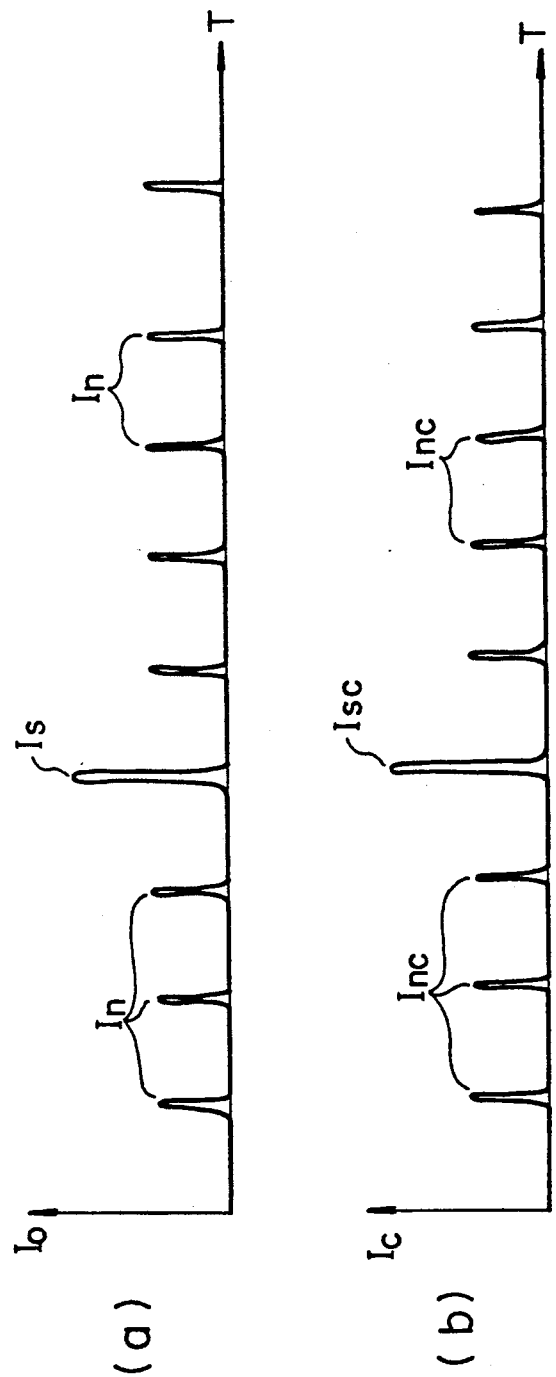
FIG. 6(a) is a time-signal output waveform illustrating a signal from a photosensor in the prior art photodetection device.
FIG. 6(b) is a time-signal output waveform illustrating an output signal from a AC coupling circuit in the prior art photodetection device.

Referring to FIG. 1, there is shown a circuit layout which can be used in a photodetection device constructed according to the present invention. The photodetection device 1 comprises first and second photosensors 11 and 12 each of which includes photodiode or the like. As shown in FIG. 5, the first and second photosensors 11 and 12 are located in the photodetection device 1 at its light receiving area and spaced vertically apart from each other. Each of these photosensors 11 and 12 is connected with an AC coupling circuit 13 or 14 which includes a capacitor or the like.

As seen from FIG. 2(a), signals $_1I_o$ from the first photosensor 11 includes a combination of normal signals $_1I_s$ based on the laser beam L from a laser projecting device 2 in the rotating laser system with disturbance signals $_1I_n$ based on disturbance rays as from the fluorescent lamp and functioning AC noise components. The AC coupling circuit 13 serves to remove DC noise components due to disturbance rays such as the sun's rays from the signals $_1I_o$. However, the AC coupling circuit 13 cannot remove AC noise components from the illumination rays from a source of pulsed rays such as fluorescent lamp. Thus, the AC coupling circuit 13 will output both normal output signals $_1I_{sc}$ and AC noise output signals $_1I_{nc}$.

Similarly, signals $_2I_o$ from the second photosensor 12 includes a combination of normal signals $_2I_s$ based on the laser beam L with disturbance signals $_2I_n$ based on the illumination rays from the source of pulsed rays such as fluorescent lamp and functioning as pulsed AC noises, as seen from FIG. 2(d). As in the AC coupling circuit 13, the AC coupling circuit 14 also outputs both normal output signals $_2I_{sc}$ and AC noise output signals $_2I_{nc}$.

The output signals from the AC coupling circuits 13 and 14 are amplified respectively by amplifiers 21 and 22 and inputted respectively into peak holding circuits 31 and 32. As seen from FIGS. 2(c) and 2(f), each of the peak holding circuits 31 or 32 functions to hold the maximum value of the output signals from the corresponding one of the AC coupling circuits 13 and 14. One of the peak holding circuits 31 is connected with a reset circuit 41 while the other peak holding circuit 32 is connected with another reset circuit 42. When a reset signal R is inputted from each of the reset circuit 41 and 42 into the corresponding peak holding circuit 31 or 32, the maximum value held therein is once reset and the maximum of another output signal again begins to be held.

The peak holding circuits 31 and 32 are connected with a multiplexer circuit 50 which is adapted selectively to provide output signals ($_1I_{sc}$, $_1I_{Ac}$), ($_2I_{sc}$, $_2I_{Ac}$) from the peak holding circuits 31 and 32 to an A/D converting circuit 51 when received commands of selection signals SE from a microprocessor (CPU) 53 in a microcomputer. After the analog output signals have been converted into digital signals at the A/D converting circuit 51, these digital signals are inputted and processed in the CPU 53.

The CPU 53 is connected with a timer circuit 52 for determining a given sampling period and a given reset timing; a RAM 55 for storing data including output signals and others; a ROM 54 in which a processing program described hereinafter has been stored; and first and second indicators 3, 4 which have been described hereinbefore in connection with FIG. 5.

Prior to the description of the operation of the above-mentioned circuit, the sampling period and the read-out timing will be described in connection with FIG. 3.

The sampling period $\tau$ (see FIG. 2(g)) is preset for the detecting and processing operations of output signals and selected to be 10 microseconds compatible to an on-off frequency of a fluorescent lamp which is equal to 100 Hz. Within the sampling period $\tau$, a routine is set such that it is completed from "START" to "END" in the flow chart of FIG. 3.

The read-out timing (hold time) r means a holding period in each of the peak holding circuits 31 and 32 or a timing wherein holding outputs are outputted to the A/D converting circuit 51 through the multiplexer circuit 50. The length of the hold time is equal to about 5%–10% of said sampling period $\tau$ and similarly counted by the timer circuit 52.

Figure 3:
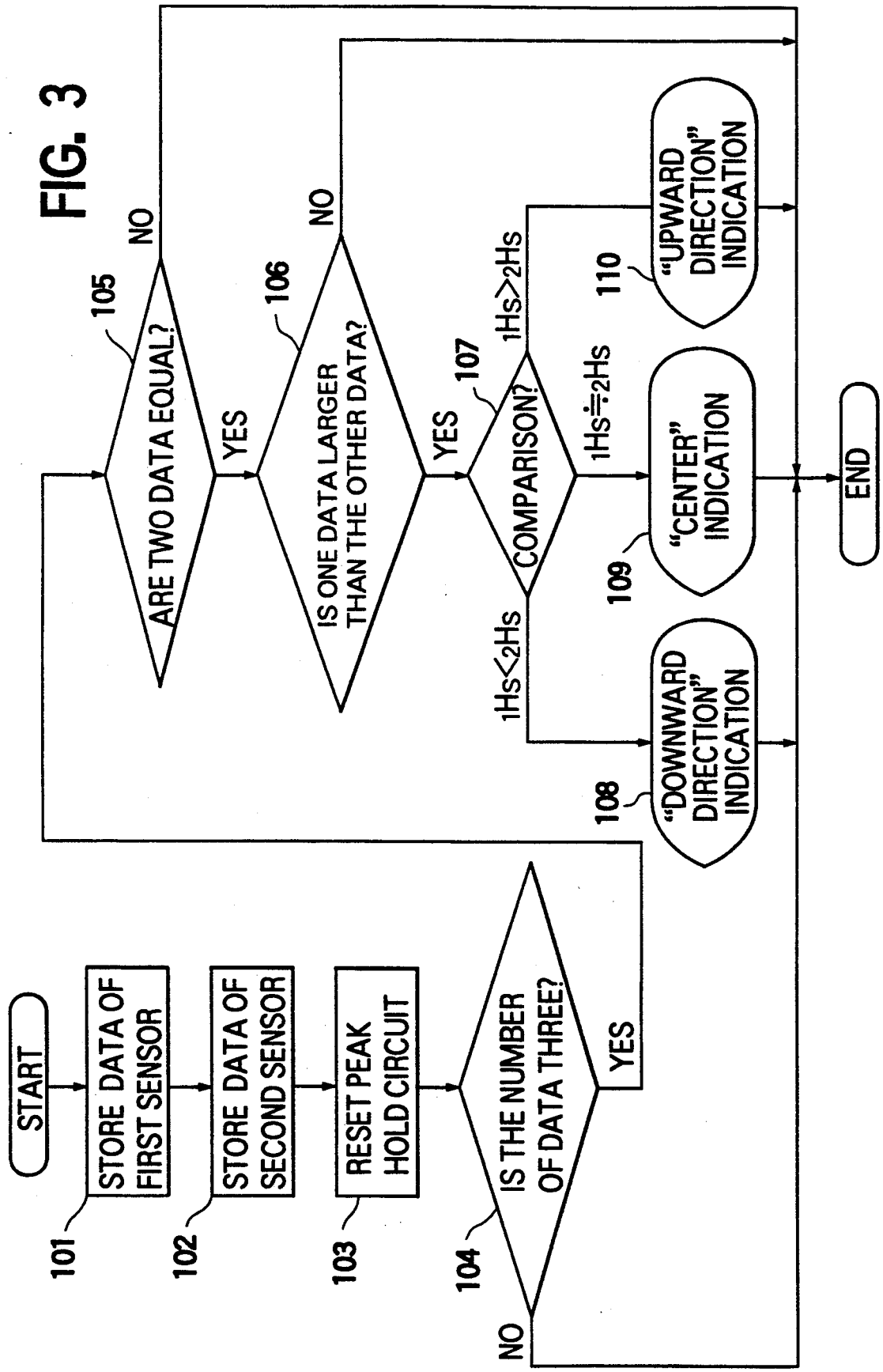
FIG. 3 is a flow chart illustrating the operation of a photodetection device constructed in accordance with the present invention.

The circuit will be operated according to the flow chart of FIG. 3.

Step 101

When the hold time has been counted by the timer circuit 52, a read-out timing signal rt is given to the CPU 53. The CPU 53 then outputs a selection signal SE to the multiplexer circuit 50 wherein the value of the maximum output signal ($_1H_s$ or $_1N_i$: i=0, 1, 2, ... N), of the first photosensor 11 held by the peak holding circuit 31 from the start step to that step during the present sampling period is inputted into the A/D converting circuit 51. The A/D converting circuit 51 converts the analog output signal ($_1H_s$ or $_1N_i$) into a digital signal which is in turn stored in a buffer at an address 101 in the RAM 55, as schematically shown in FIG. 4.

If output signal data obtained from the previous sampling periods have been already stored at address buffers 101 or 103, output signal data stored at the address buffer 103 is cancelled and the subsequent output signal data is sequentially shifted to the address buffers 103 and 102. Thus, the output signal data in the present sampling period will be always stored at the address buffer 101.

Step 102

Subsequently, the CPU 53 again outputs a selection signal SE to the multiplexer circuit 50 which in turn provides the maximum output signal ($_2H_s$ or $_2N_i$: i=0, 1, 2, ... N) of the second photosensor 12 from the peak holding circuit 32 during the present sampling period from the start to that time point to the A/D converting circuit 51. The A/D converting circuit 51 then converts the analog output signal ($_2H_s$ or $_2N_i$) into a digital signal which is in turn stored in the RAM 55 at an address buffer 201, as shown in FIG. 4.

If the output signals obtained from the previous sampling periods have been already stored at the address buffers 201 to 203, the output signal at the address buffer 203 is cancelled, with the subsequent output signal data being sequentially shifted to the address buffers 203 and 202. Thus, the output signal data from the present sampling period will be always stored in the RAM 55 at the address buffer 201.

Step 103

CPU 53 outputs a reset command signal RS to the reset circuits 41 and 42. Each of the reset circuits 41 and 42 then outputs a reset signal R to the corresponding one of the peak holding circuits 31 and 32 which receive the reset command signal RS, such that the peak holding circuit 31 or 32 will be caused to reset the maximum output signal value which has been held therein. After reset, the peak holding circuits 31 and 32 begin to hold the maximum output signal value from the respective amplifiers 21 and 22.

Step 104

CPU 53 discriminates whether or not the number of taken data becomes three by checking whether or not data have been stored in all the three buffers on each of the sets of address buffers 101 to 103 for saving the output of the first photosensor and address buffers 201 to 203 for saving the output of the second photosensor.

If the number of taken data is three, the program proceeds the next step 105. If not so, the next sampling period is initiated by a count-out signal ts from the timer 52 with respect to the sampling period $\tau$.

Step 105

CPU 53 reads out each of the sets of data in which the number of taken data is three and which have been stored in the RAM 55. Three data in each set of read data are compared with each other. From the comparison, the CPU 53 judges whether or not two data in each set of data are substantially equal to each other within a predetermined margin (for example, within 10%).

If the two output signal are equal to each other, it is determined that they are noise signals ($_1N_i$ or $_2N_i$) from the fluorescent lamp and that the one remaining signal is a normal signal ($_1H_s$ or $_2H_s$) from the laser beam L. The program then proceeds the next step 106. If all the three output signals are different from each other or equal to each other, it is discriminated that all data obtained from the present sampling period are noise signals ($_1N_i$ or $_2N_i$) from the fluorescent lamp or other signal from any error. Thus, these output signals will not be utilized for the subsequent signal processing step on measurement. The next sampling period is initiated by a count-out signal ts outputted from the timer circuit 52 in respect to the sampling period $\tau$.

Step 106

CPU 53 judges whether or not the one remaining output signal is larger than the two output signals which have been judged to be equal to each other. If the one remaining output signal is larger than the two output signals, it is discriminated that it is a normal signal ($_1H_s$ or $_2H_s$) from the laser beam L. The program then proceeds the next step 107 wherein the normal signal is utilized as measurement data. If the one remaining output signal is smaller than the two output signals, it is judged that the output signal is any noise signal which will not be utilized in the subsequent signal processing step for measurement. Thereafter, a count-out signal ts in respect to the sampling period $\tau$ is outputted from the timer circuit 52 and used to initiate the next sampling period.

Steps 107 through 110

CPU 53 compares the sets of output signals which have been judged at the step 106 to be larger, that is, normal signals ($_1H_s$ or $_2H_s$). If only one of the first and second photosensors 11 or 12 outputs a normal signal ($_1H_s$ or $_2H_s$), the normal signal from the other photosensor is judged to be data "zero" and then compared with the resulting normal signal.

If one normal signal $_1H_s$ is smaller than the other normal signal $_2H_2$, this means that the reference mark 5 in the photodetection device is positioned above the reference plane P defined by the laser beam L. Thus, the program proceeds a step 108 wherein the "downward direction" indicators 3a and 4a are lighted on so that an operator can know a direction in which the photodetection device is to be moved.

If one normal signal $_1H_s$ is substantially equal to the other normal signal $_2H_s$, this means that the reference mark 5 of the photodetection device is aligned with the reference plane P defined by the laser beam L. Thus, the program proceeds a step 109 wherein the "center" indicators 3c and 4c are lighted on. The operator draws a levelling mark 1e along the reference mark 5.

If one normal signal $_1H_s$ is larger than the other normal signal $_2H_s$, this means that the reference mark 5 in the photodetection device is located below the reference plane P. The program proceeds a step 110 wherein the "upward direction" indicators 3b and 4b are lighted on. The operator can know a direction in which the photodetection device is then to be moved.

Since the normal signal $_1H_s$ is larger than the other normal signal $_2H_s$ in this embodiment, the program proceeds the step 110 wherein the "upward direction" indicators 3b and 4b are lighted on.

Figure 2:
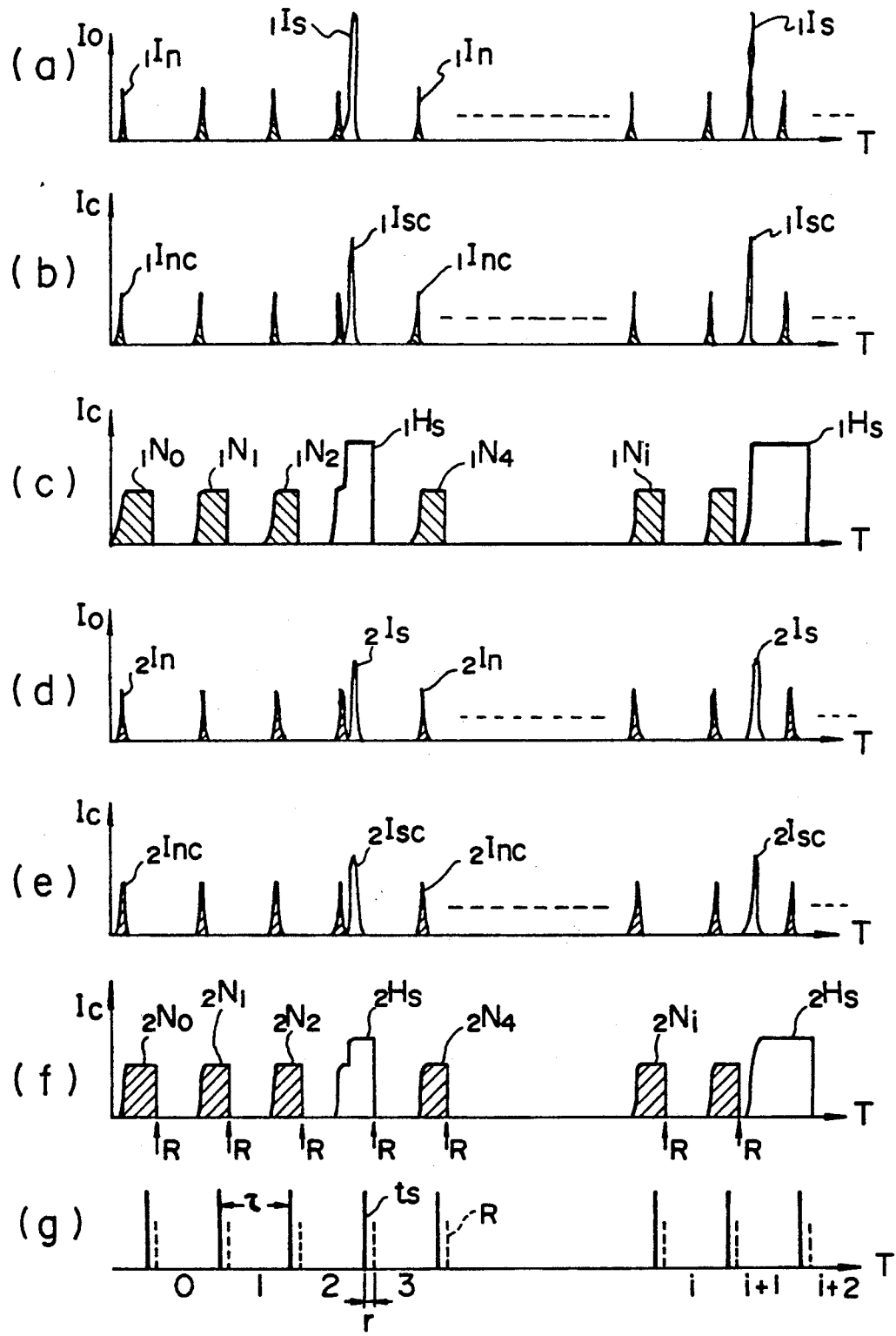
FIG. 2(a) is a time-signal output waveform illustrating a signal from the first photosensor 11.
FIG. 2(b) is a time-signal output waveform illustrating a output signal from the AC coupling circuit 13.
FIG. 2(c) is a time-signal output waveform illustrating an output signal from the peak holding circuit 31.
FIG. 2(d) is a time-signal output waveform illustrating a signal from the second photosensor 12.
FIG. 2(e) is a time-signal output waveform illustrating an output signal from the AC coupling circuit 14.
FIG. 2(f) is a time-signal output waveform illustrating an output signal from the peak holding circuit 32.
FIG. 2(g) is a timing chart illustrating the relationship between sampling periods $\tau$, reset signals R and read-out timing r.

As seen from FIG. 2, the entrance of the laser beam L into the first and second photosensors 11 and 12 during the (i+1)th sampling period is made after reset signals R are inputted from the reset circuits 41 and 42 to the respective peak holding circuits 31 and 32. Signals inputted into the RAM 55 at the steps 101 and 102 are stored in the same RAM 55 as zero signals. At the step 106, the program proceeds a routine for the (i+2)th sampling period. However, the peak holding circuits 31 and 32 continue to hold the maximum signal values of the laser beam L from the photosensors 11 and 12 after the reset signals have been inputted into the peak holding circuits 31 and 32. In addition, the signals from the laser beam L are larger than noise signals even if they are created from the fluorescent lamp during the (i+2)th sampling period. Therefore, the data of signal from the laser beam L can be taken during the (i+2)th sampling period.

Figure 7:
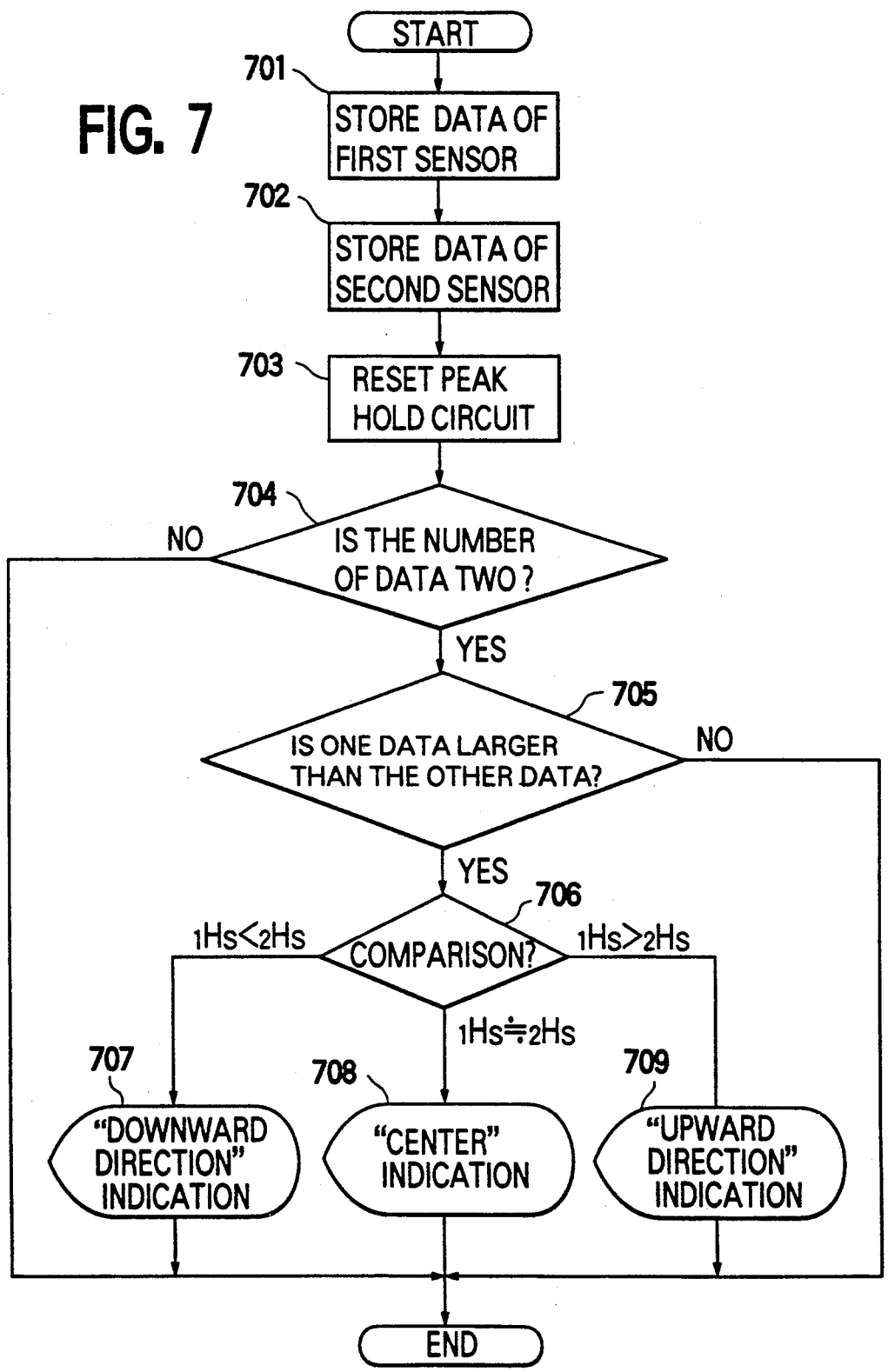
FIG. 7 is a flow chart similar to FIG. 3, illustrating the second embodiment of the present invention.

The second embodiment of the present invention will be described with reference to FIGS. 7 and 8. The second embodiment is different from the aforementioned embodiment with respect to the program executed in the CPU 53, but similar to the previous embodiment in all the other respects.

The operation of the second embodiment will now be described in connection with the flow chart shown in FIG. 7.

Steps 701 through 703

As in the steps 101 through 103 of FIG. 3, the maximum output signals from the first and second photosensors 11 and 12 are stored in a RAM 55 schematically shown in FIG. 8 at address buffers 801 and 901 (Steps 701 and 702). Subsequently, the maximum output signal values held in the peak holding circuits 31 and 32 are reset (Step 703).

If on Storage at the step 701, output signals obtained in the previous sampling periods have been already stored at the address buffer 801, the data is shifted to an address buffer 802. If the address buffer 802 has stored data in the second sampling period before the present sampling period, the data is cancelled. In such a manner, the output signal from the first photosensor 11 during the present sampling period will be always stored at the address buffer 801, with the previous data being sequentially shifted to the address buffer 802.

Also at Step 702, similarly, the output signal from the second photosensor 12 during the present sampling period is always stored at the address buffer 901 and the previous data is sequentially shifted to an address buffer 902.

Step 704

CPU 53 discriminates whether or not the number of taken data becomes two by checking whether or not data have been stored in all the two buffers on each of the sets of address buffers 801 to 802 for saving the output of the first photosensor and address buffers 901 to 902 for saving the output of the second photosensor.

If the number of taken data is two, the program proceeds the next step 705. If the number of taken data is less than two, the next sampling period is initiated by a count-out signal ts outputted from the timer 52 with respect to the sampling period $\tau$.

Step 705

CPU 53 read out each set of data in which the number of taken data is two and which have been stored in the RAM 55. CPU 53 judges whether or not one data in each set larger than the other data in the same set by a degree exceeding a given rate (for example, 10%). If the one data is larger than the other data, it is judged that the former is a normal signal ($_1H_s$, $_2H_s$) from the laser beam L. The program proceeds the next step 706 wherein the normal signal is used as measurement data. If the one data is smaller than the other data, it is judged that both the data are noise signal ($_1N_i$, $_2N_i$) as from the fluorescent lamp. These noise signals will not be utilized for measurement. A count-out signal ts with respect to the sampling period $\tau$ is outputted from the timer circuit 52 and used to initiate the next sampling period.

Steps 706 through 709

CPU 53 compares output signals of each set which have been judged to be larger at the step 705, that is, normal signals ($_1H_s$, $_2H_s$) (Step 706). If a normal signal ($_1H_s$ or $_2H_s$) is outputted only from one of the first and second photosensors 11 or 12, the other normal signal data is determined to be zero and then compared with the resultant normal signal, as at the step 106 shown in FIG. 3.

As at the steps 108 through 110 of FIG. 3, the "downward direction" indicators 3a and 4a are lighted on if the normal signal $_1H_s$ is smaller than the other normal signal $_2H_s$ (Step 707). The "center" indicators 3c and 4c are lighted on if the normal signals ($_1H_s$, $_2H_s$) are substantially equal to each other (Step 708). If one of the normal signals $_1H_s$ is larger than the other normal signal $_2H_s$, the "upward direction" indicators 3b and 4b are lighted on (Step 709).

What is claimed is:
1. A light beam detection method, comprising:
   1) converting a received light beam into an electrical signal;
   2) holding a value of the electrical signal that is a maximum value of the electrical signal for a predetermined sampling period;
   3) storing the maximum value of the electrical signal in a memory as a stored value;
   4) determining whether or not three maximum values have been stored in the memory;
   5) comparing the stored values with each other, when it is determined that three such maximum values have been stored; and
   6) performing a further step, based on the comparing step, the further step including either:
      6a) using a first stored value of the three stored values for subsequent signal processing; or
      6b) concluding that the stored values are based on noise; the further step being chosen depending on whether or not:
         i) the first stored value is larger than second and third of the three stored values; and
         ii) the second and third stored values are substantially equal to each other.
2. A light beam detection apparatus, comprising:
   1) light receiving means for converting a received light beam into an electrical signal;
   2) peak holding means for holding a value of the electrical signal, that is a maximum value of the electrical signal for a predetermined sampling period;
   3) means for storing the maximum value of the electrical signal as a stored value;
   4) means for determining whether or not three maximum values have been stored;

5) means for comparing the stored maximum values with each other, when the means for determining determines that three maximum values have been stored; and
6) means for judging whether the light beam detection apparatus should either:
   6a) use a first stored value of the three stored values for subsequent signal processing; or
   6b) conclude that the stored values are based on noise; the judging depending on whether or not:
      i) the first stored value is larger than second and third of the three stored values; and
      ii) the second and third stored values are substantially equal to each other.

3. The light beam detection apparatus of claim 2, wherein:
the storing means includes RAM; and
the means for determining and the means for judging include a microprocessor.

4. In a light beam detection apparatus having at least two light receiving means for receiving a beam of light turned about a vertical axis to define a reference plane and for converting the received light beam into an electrical signal, the light beam detection apparatus being adapted to measure the amount of light beam entering it and to output a signal representing a relative positional relationship between the entering light beam and the reference plane, the improvement comprising:
1) peak holding means for holding a value of the electrical signal, that is a maximum value of the electrical signal for a predetermined sampling period;
2) means for storing the maximum value of the electrical signal as a stored value;
3) means for determining whether or not three maximum values have been stored;
4) means for comparing the stored maximum values with each other, when the means for determining determines that three maximum values have been stored; and
5) means for judging whether the light beam detection apparatus should either:
   5a) use a first stored value of the three stored values for subsequent signal processing; or
   5b) conclude that the stored values are based on noise; the judging depending on whether or not:
      i) the first stored value is larger than second and third of the three stored values; and
      ii) the second and third stored values are substantially equal to each other.

5. A light beam detection method, comprising:
1) converting a received light beam into an electrical signal;
2) holding a value of the electrical signal that is a maximum value of the electrical signal for a predetermined sampling period;
3) storing the maximum value of the electrical signal in a memory as a stored value;
4) determining whether or not two maximum values have been stored in the memory;
5) comparing the stored values with each other, when it is determined that two such maximum values have been stored; and
6) performing a further step, based on the comparing step, the further step including either:
   6a) using a first stored value of the two stored values for subsequent signal processing; or
   6b) concluding that the stored values are based on noise;
the further step being chosen depending on whether or not the first stored value is larger than the second stored value.

6. A light beam detection apparatus, comprising:
1) light receiving means for converting a received light beam into an electrical signal;
2) peak holding means for holding a value of the electrical signal, that is a maximum value of the electrical signal for a predetermined sampling period;
3) means for storing the maximum value of the electrical signal as a stored value;
4) means for determining whether or not two maximum values have been stored;
5) means for comparing the stored maximum values with each other, when the means for determining determines that two maximum values have been stored; and
6) means for judging whether the light beam detection apparatus should either:
   6a) use a first stored value of the two stored values for subsequent signal processing; or
   6b) conclude that the stored values are based on noise;
the judging depending on whether or not the first stored value is larger than second store value.

7. The light beam detection apparatus of claim 6, wherein:
the storing means includes RAM; and
the means for determining and the means for judging include a microprocessor.

8. In a light beam detection apparatus having at least two light receiving means for receiving a beam of light turned about a vertical axis to define a reference plane and for converting the received light beam into an electrical signal, the light beam detection apparatus being adapted to measure the amount of light beam entering it and to output a signal representing a relative positional relationship between the entering light beam and the reference plane, the improvement comprising:
1) peak holding means for holding a value of the electrical signal, that is a maximum value of the electrical signal for a predetermined sampling period;
2) means for storing the maximum value of the electrical signal as a stored value;
3) means for determining whether or not two maximum values have been stored;
4) means for comparing the stored maximum values with each other, when the means for determining determines that two maximum values have been stored; and
5) means for judging whether the light beam detection apparatus should either:
   5a) use a first stored value of the two stored values for subsequent signal processing; or
   5b) conclude that the stored values are based on noise;
the judging depending on whether or not the first stored value is larger than second store value.

* * * * *